(No Model.)

J. M. WADLINGTON.
TREE PROTECTOR.

No. 285,186. Patented Sept. 18, 1883.

WITNESSES
S. G. Nottingham
G. F. Downing

INVENTOR
John M. Wadlington
By H. A. S.
Attorney

UNITED STATES PATENT OFFICE.

JOHN M. WADLINGTON, OF MARSHALL, MISSOURI.

TREE-PROTECTOR.

SPECIFICATION forming part of Letters Patent No. 285,186, dated September 18, 1883.

Application filed March 8, 1883. (No model.)

*To all whom it may concern:*

Be it known that I, JOHN M. WADLINGTON, of Marshall, in the county of Saline and State of Missouri, have invented certain new and useful Improvements in Fruit-Tree Protectors; and I do hereby declare the following to be a full, clear, and exact description of the invention, such as will enable others skilled in the art to which it pertains to make and use the same.

My invention relates to an improvement in fruit-tree protectors, the object of the same being to provide a cheap, simple, and effective guard for the body of the tree; and it consists in the parts and combinations of parts, as will be more fully described, and pointed out in the claim.

Figure 1:
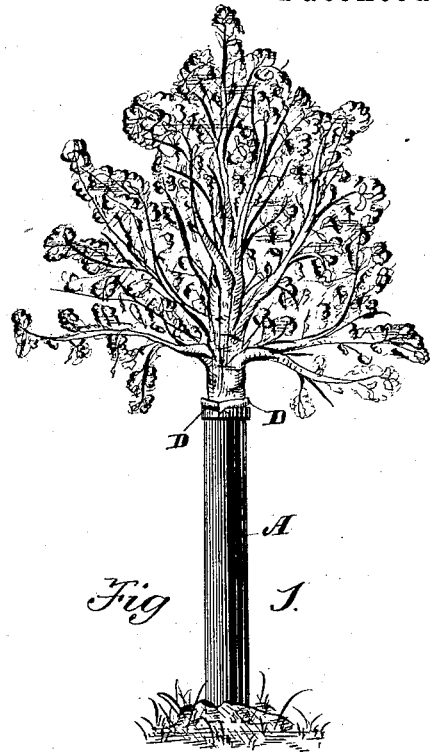
Figure 2:
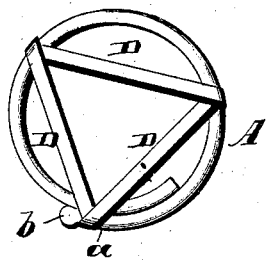

In the accompanying drawings, Figure 1 shows my improvement as applied to a tree, and Fig. 2 is a plan view of the same removed.

A represents the guard, made of tin or other flexible metal, the side edge a of which overlaps the opposite side edge, forming an elongated circular envelope adapted to surround the tree. A loose joint or connection is formed by the adjacent edges of the envelope, which enables the same to expand as the tree increases in circumference, and the outer edge a is preferably provided with a bead, b, which latter bears against the adjacent portion of the guard and forms a close joint, thereby preventing the entrance of insects. The upper open end of the guard A is crossed by the rubber or other elastic strips D, which latter are secured to the guard in any suitable manner, and are adapted to prevent the upper edge of the metallic envelope from injuring the tree by contact therewith. This strip or strips, besides performing the function above noted, also serves to hold the guard upright and prevents it from moving unnecessarily.

To place the guard around the body of the tree it is only necessary to open it sufficiently to enable the trunk to pass between the adjacent edges and then release it, when it folds up around the tree, as shown. The lower end of the guard is then forced into the ground several inches, and sufficient lime is then thrown into the space between the guard and tree to protect the roots. This improvement not only protects the body of the tree from large animals, but also prevents worms, insects, &c., from getting at the roots of the trees (where it is usually moist) to deposit their eggs.

My invention is simple in construction, is durable and efficient in use, and can be manufactured at a small initial cost.

Having fully described my invention, what I claim as new, and desire to secure by Letters Patent, is—

The combination, with the flexible guard or envelope formed with overlapping edges, of rubber or equivalent strips D, arranged substantially as shown, and located at the top of the guard or envelope, substantially as set forth.

In testimony whereof I have signed this specification in the presence of two subscribing witnesses.

JOHN MAHLON WADLINGTON.

Witnesses:
J. WALTERS,
JOHN BECK.